United States Patent

[11] 3,576,309

| [72] | Inventors | John P. Zawacki<br>Houston;<br>ERvin A. Buchta, Katy, Tex. |
|---|---|---|
| [21] | Appl. No. | 800,440 |
| [22] | Filed | Feb. 19, 1969 |
| [45] | Patented | Apr. 27, 1971 |
| [73] | Assignee | FMC Corporation<br>San Jose, Calif. |

[54] TOP ENTRY BALL VALVE
9 Claims, 3 Drawing Figs.

[52] U.S. Cl..................................................... 251/174,
251/315, 251/317, 137/327
[51] Int. Cl..................................................... F16k 5/06
[50] Field of Search........................................ 137/327,
454.2, 454.6; 251/174, 315, 316, 317

[56] References Cited
UNITED STATES PATENTS

| 583,183 | 5/1897 | Kepler | 137/327X |
| 2,885,179 | 5/1959 | Hartmann | 251/315 |
| 3,000,393 | 9/1961 | Maynard | 137/454.2 |
| 3,219,055 | 11/1965 | Dumm | 251/315X |

*Primary Examiner*—Harold W. Weakley
*Attorneys*—F. W. Anderson and C. E. Tripp

ABSTRACT: A rotary-type top entry ball valve, with a ball closure element and a seat assembly that are installed in the valve body and removed therefrom as a unit. The seat assembly includes annular ball element seats, retainers for supporting the seats and ball element, springs for biasing the seats into sealing engagement with the ball element, seat inserts supporting the springs and assisting in sealing the assembly to the valve body, and an assembly retainer sleeve with a dual function of holding the seat assembly together as a unit and providing a seal between it and the valve.

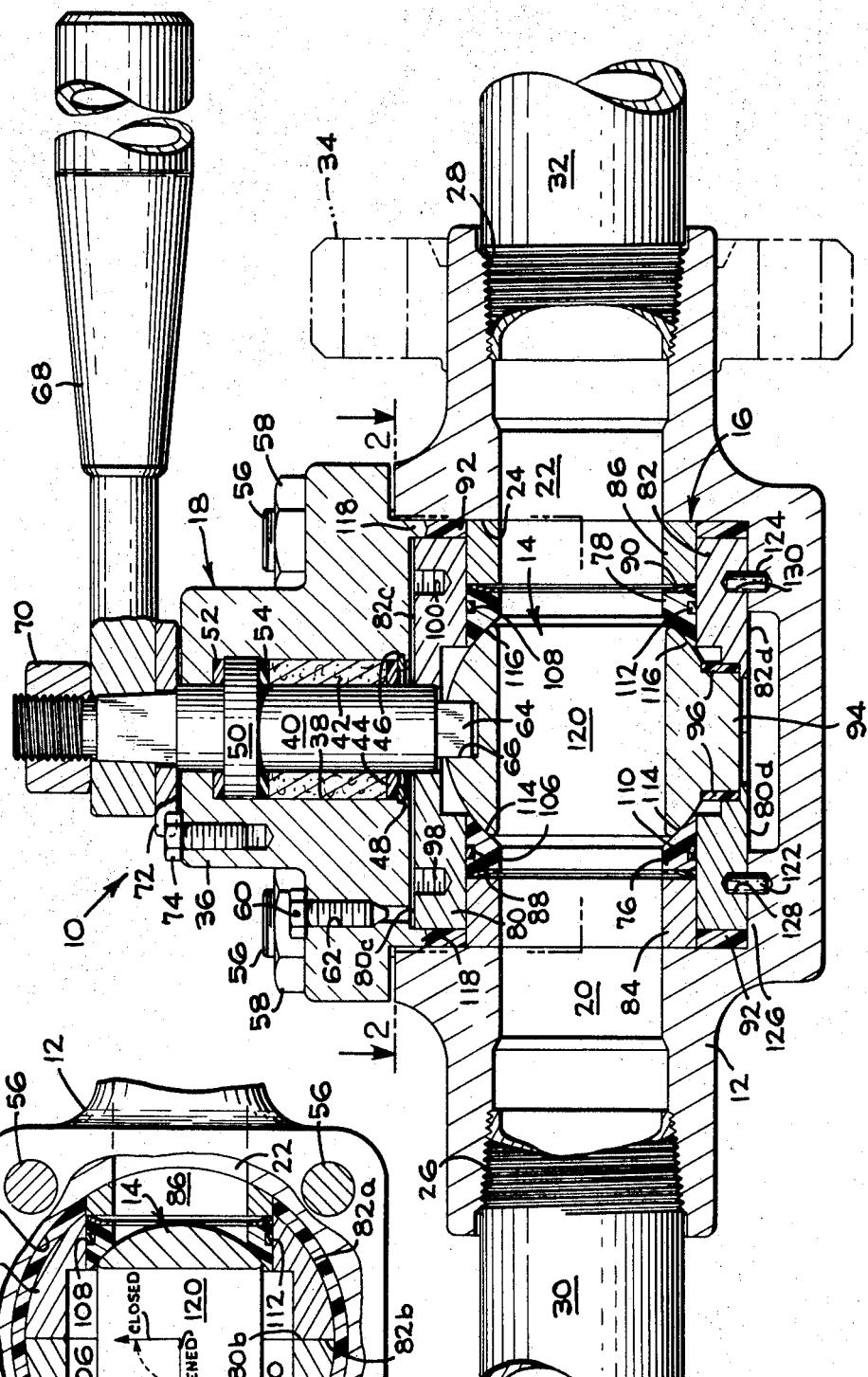

3,576,309

1

TOP ENTRY BALL VALVE

BACKGROUND OF THE INVENTION

This invention relates to spherical-type plug valves, commonly referred to as ball valves, and further to ball valves with provision for access to the valve chamber through the top of the valve body, in other words, a top entry ball valve. More particularly, this invention pertains to a top entry ball valve seat assembly that can be installed in and removed from the valve body as a unit while the valve remains connected into the pipe or flow line.

Top entry rotary-type valve ball valves with replaceable seat assemblies are now conventional in the art. Generally speaking, they comprise a valve body with an open-ended valve chamber between axially aligned inlet and outlet ports, a rotatable ball-shaped valve closure element in the valve chamber, a valve seat or seats between the ball element and the valve body, and a bonnet or cover for the chamber and through which extends a stem to rotate the ball element between open and closed positions. The ball element has a bore that aligns with the inlet and outlet ports to complete a flow passage through the valve when it is in the open condition, and the seat provides a fluidtight seal around the flow passage between the ball element and the valve body. Although to an extent they constitute an improvement over various other types of valves for similar utility, many of the known top entry ball valves have features that, for one reason or another, are undesirable.

For example, the seats of some of these valves comprise several parts that must be installed in and removed from the valve body individually, and that often require special manipulation and/or costly time to replace. In addition, many of these valves have chambers with irregular shapes and convoluted surfaces that are comparatively difficult and expensive to manufacture, and that also increase the time and skill required to service the valve. Furthermore, where a fluidtight joint must be provided between the valve body and the bonnet, and where the valve's internal parts must be packed off, special seats and packings in specially formed grooves or spaces are used, which significantly raises the ultimate cost of the valve.

One of the objects of this invention is to overcome the foregoing problems by providing a top entry ball valve with a seat assembly of several elements that are installed in, and removed from, the valve body as a single unit.

Another object of the invention is to provide a new type of valve seat assembly with an element that functions both to hold the assembly together as a unitary structure, and also to cooperate with the valve body and its bonnet to establish a fluidtight seal therebetween and pack off the elements of the assembly.

Further objects of this invention include the provision of a valve seat assembly of relatively simple parts that are easy and quick to assemble, require no special manipulation when installing in or removing from the valve, and are relatively inexpensive to manufacture.

SUMMARY OF THE INVENTION

The present invention comprises a novel multicomponent seat assembly for a rotary-type top entry ball valve. This assembly includes annular seats for the valve's ball closure element, seat retainers that fit around and support the seats and the ball element, a system of springs to bias the seats toward the ball element, annular seat inserts that support the springs and assist in sealing the assembly to the valve, and an assembly retainer sleeve that fits around and holds the seats, the seat retainers, the springs, and the seat inserts together as a self-supporting unit, thereby facilitating the installation of all these elements in, and also their removal from, the valve chamber as a unitary structure without need for special tools or complex or difficult manipulation. When the valve is assembled, its bonnet exerts a compressive force on the assembly retainer sleeve and urges a fluidtight seal between the bonnet, the valve body, the seat inserts, and the seat retainers. In its preferred form the valve has a cylindrical chamber with an upright axis, so that the seat assembly can be installed or removed without unusual skill or equipment, and pins extending up from the floor of the chamber coincide with holes in the bottom surfaces of the seat retainers to facilitate quick alignment of the assembly with the valve's inlet and outlet flow openings.

BRIEF DESCRIPTION OF THE DRAWINGS

In the drawings,

FIG. 1 is a view in vertical section along the axis of the flow passage of a fully assembled top entry ball valve embodying the principles of the instant invention, with the seat assembly installed and the ball closure element in an open position.

FIG. 2 is a view taken along the line 2–2 of FIG. 1, but with the ball in its closed position.

DESCRIPTION OF THE PREFERRED EMBODIMENT

Figure 3:
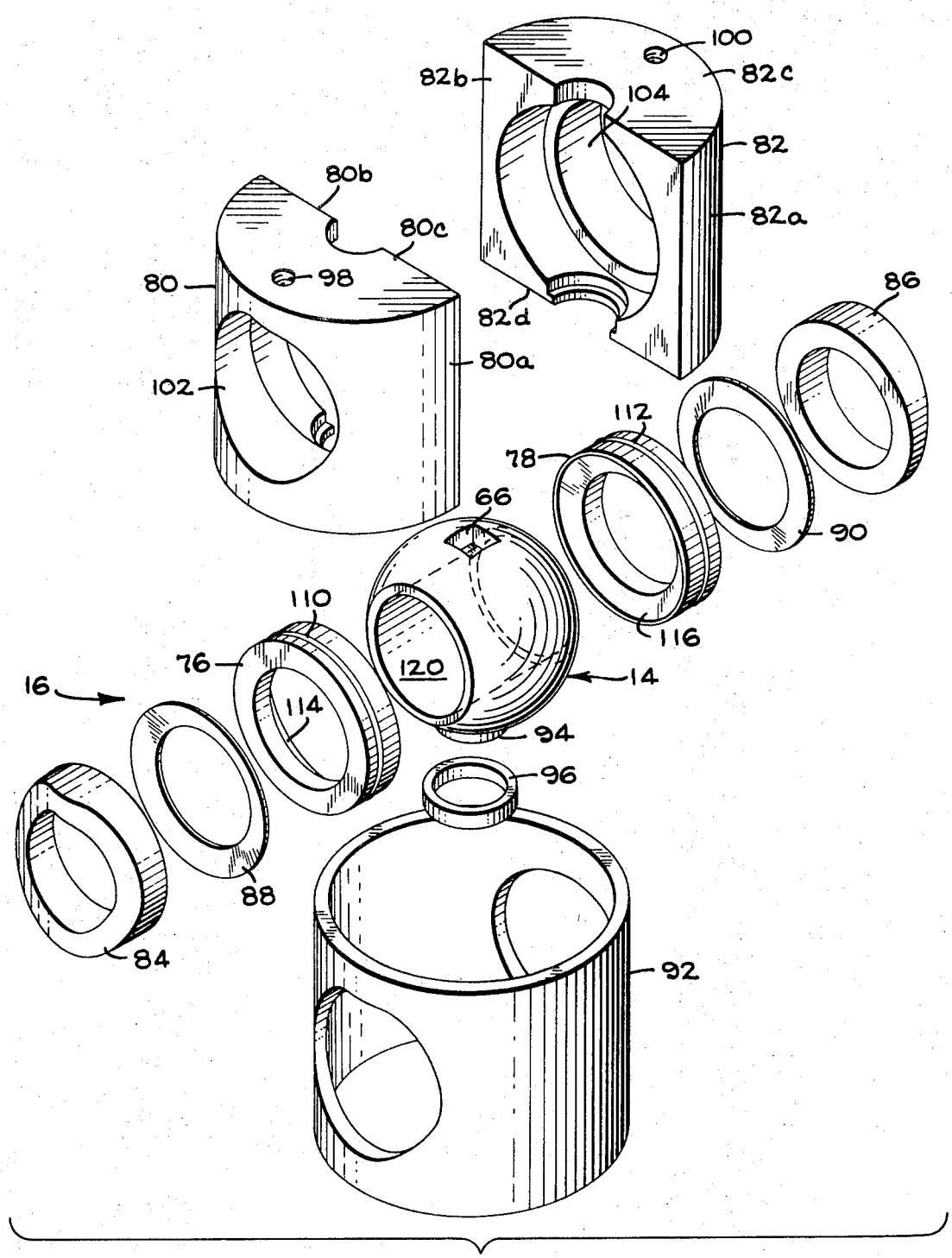
FIG. 3 is an exploded isometric view, on an enlarged scale, of a seat assembly and a ball closure element according to the invention.

Broadly considered, and with reference to the drawings, the top entry ball valve 10 embodying the principles of this invention comprises a valve body 12, a ball closure element 14, a seat assembly 16, and a bonnet assembly 18. The valve body 12 has a pair of axially aligned flow openings 20, 22, and an upright cylindrical valve chamber 24 disposed therebetween. The flow openings 20, 22 can be threaded as at 26, 28, respectively, for connecting the valve into a fluid conduit, such as pipe sections 30, 32, respectively, or the valve body can include conventional flange fittings, such as that indicated in phantom at 34 in FIG. 1.

The bonnet assembly 18 comprises a bonnet 36, a stuffing box 38, and a valve stem 40 that extends through and is packed off to the box 38 by packing 42 of fibrous or other suitable material. The packing 42 is held in the box 38 by an annular washer 44 and a split retainer ring 46 that fits into a groove 48. An annular flange 50 on the valve stem 40 cooperates through antifriction rings 52, 54 with the upper end wall of the stuffing box 38 and the packing 42 to retain the stem in the bonnet 36. The bonnet assembly 18 is removably secured to the valve body 12 by studs 56 and hex nuts 58. A screw 60 and the threaded passage 62 extending between the interior and exterior surfaces of the bonnet 36, facilitate bleeding off any excess pressure that might develop inside the valve body 12.

The valve stem 40 has a square-shaped lower end 64 that fits into a complementary socket 66 in the top of the ball 14, and a handle 68 drivingly engages the stem's upper end and is secured thereto by a nut 70. Thus rotation of the stem 40 by the handle 68 likewise rotates the ball 14 to open and close the valve. A stop plate 72, which is secured to the valve stem 40, and a stop screw 74 threaded into the bonnet 36 cooperate to limit the rotation of the stem and the ball 14 between the valve's fully open and closed positions, as indicated by the arrows in FIG. 2.

Of primary significance to this invention is the seat assembly 16. In the illustrated embodiment this assembly comprises a pair of annular ball element seats 76, 78, a pair of seat retainers 80, 82, with semicylindrical side surfaces 80a, 82a, flat side surfaces 80b, 82b, that are relieved sufficiently to accommodate but not contact the ball 14, and flat end surfaces 80c, 80d, 82c, 82d, respectively, a pair of annular seat inserts 84, 86, Belleville springs 88, 90 disposed between the seats and seat inserts, and an assembly retainer sleeve 92 holding the assembly together in the relationship illustrated in FIGS. 1 and 2. This assembly 16, along with the ball 14 that is substantially enclosed by the seat retainers 80, 82, and also journaled therein at its lower end by means of a trunnion 94 and an antifriction trunnion bearing 96, is installed in and removed from the valve 10 as a unit by simply lowering it into, or lifting it from, the valve chamber 24. Tapped holes 98, 100 in the seat retainers top surfaces 80c, 82c, facilitate attaching a temporary handle or the like (not shown) if such is desired for manipulating the assembly, as perhaps in installing or removing an assembly of large size and weight.

The seats 76, 78 and the assembly retainer sleeve 92 preferably are constructed of a polyamide plastic such as nylon, a fluoro-carbon plastic such as "Teflon" (E. I. duPont de Nemours trademark for their polytetrafluoroethylene), or some material suitable compressible to form a fluidtight seal. The seat retainers 80, 82 and the seat inserts 84, 86 preferably are constructed of a hard, rigid, nondeformable material, such as steel. The seats 76, 78 are slidable in the seat retainers' lateral bores 102, 104, and are provided with external annular grooves 106, 108, for accommodating annular fluid seals 110, 112, respectively. The seats 76, 78 preferably have beveled surfaces 114, 116 (FIGS. 1 and 2) that are held in fluidtight engagement with the ball 14 by the Belleville springs 88, 90. These springs are supported axially by the seat inserts 84, 86, that in turn are supported axially by the wall of the valve chamber 24.

One of the important features of this assembly 16 is the unique manner in which it is packed off or sealed to the valve 10. The bonnet 36 has a downwardly projecting annular flange 118 that, when the valve is assembled, extends in between the valve chamber 24 and the seat retainers 80, 82 and compresses the assembly retainer sleeve 92. This compression forces the sleeve 92 into fluidtight contact with the valve body 12, the bonnet 36, the seat retainers 80, 82, and the seat inserts 84, 86. In other words, the function of packing off the seat assembly 16 to the valve 10 is fulfilled by the assembly sleeve 92 itself, thereby obviating any need for additional elements for this purpose. As will be noted, this constitutes a second function in addition to that of holding the seat assembly 16 together as a unit, as explained above.

Another important feature of this invention is that the seat assembly 16 and the ball element 14 can be put together into a unit outside of the valve 10, and then this unit installed in the valve without special tools or difficult manipulation. Moreover, this can be accomplished easily and quickly without disconnecting the valve from either of the pipes 30, 32, thereby simplifying its servicing. To assemble this unit, the seats 76, 78 and the Belleville springs 88, 90 are inserted into the seat retainers 80, 82, and the seat retainers then fitted together around the ball element 14, thereby forming somewhat of a subassembly. The assembly retainer sleeve 92 is then placed around this subassembly, as by sliding it over the seat retainers 80, 82, and the seat inserts 84, 86 are then inserted into the bores of the assembly retainer sleeve and the seat retainers.

When the seat assembly 16 is placed in the valve chamber 24, it is oriented so that the seat inserts 84, 86 are aligned coaxially with the flow openings 20, 22 to establish, along with the diametrical bore 120 of the ball element 14, a fluid passageway through the valve. This orientation is facilitated by pins 122, 124 that extend upwardly from the floor 126 of the valve chamber 24 into positioning holes 128, 130 in the bottom end surfaces 80d, 82d of the seat retainers 80, 82, respectively. The bonnet assembly 18 then is placed on the valve body 12, and the hex nuts 58 tightened down on the studs 56, completing the assembly procedure.

Removing the seat assembly 16 from the valve 10 involves merely removing the hex nuts 58, lifting the bonnet assembly 18 off the valve body 12 and the studs 56, and then lifting the assembly 16 as a unit straight up out of the valve chamber 24. No special manipulation of the assembly or any of its elements is required, and the procedure can be completed in a minimum of time.

Although the best mode contemplated for carrying out the present invention has been herein shown and described, it will be apparent that modification and variation may be made without departing from what is regarded to be the subject matter of the invention.

We claim:

1. In a rotary ball valve comprising a valve bonnet, a valve body having a valve chamber and a pair of flow openings communicating with said chamber, and a ball closure element having a diametrical bore, a seat assembly surrounding said ball closure element and positioned in said valve chamber, said seat assembly comprising:
 a. annular seats for providing a fluidtight seal between said assembly and said ball closure element;
 b. seat retainers surrounding said ball closure element having bores for slidably supporting said annular seats;
 c. spring means in said seat retainer bores biasing said seats against said ball closure element;
 d. annular seat inserts in said seat retainer bores axially supporting said springs; and
 e. an assembly retainer sleeve slidably surrounding said seat retainers and having lateral bores coaxial with said seat retainer bores and registrable with said valve body flow openings, said seat inserts extending into said lateral bores, said assembly retainer sleeve holding said seat assembly together as a self-supporting unit.

2. A valve according to claim 1 wherein said assembly retainer sleeve establishes a seal between said assembly, said valve body, and said bonnet.

3. A valve according to claim 2 wherein said valve bonnet has means for exerting a compressive force on said assembly retainer sleeve to urge said sleeve into tight contact with said valve body, said heat inserts, and said seat retainers.

4. A valve according to claim 2 wherein said valve chamber and said assembly retainer sleeve are cylindrical, and said seat assembly is slidable axially into and out of said valve chamber as a unit.

5. A valve according to claim 4 wherein said seat retainers are of semicylindrical configuration with flat side surfaces that are relieved to accommodate yet not contact said ball closure element.

6. A valve according to claim 1 wherein said valve body and said seat retainers have cooperating means for orienting said seat assembly in said valve.

7. A valve according to claim 1 wherein said seat retainers have means for securing seat assembly manipulation means thereto.

8. A seat assembly for a ball valve, said valve comprising a valve bonnet, a body having a valve chamber and a pair of flow openings communicating with said chamber, and a ball closure element with a diametrical bore, said assembly comprising:
 a. annular seats for providing a fluidtight seal between said assembly and said ball closure element;
 b. seat retainers for surrounding said ball closure element and having bores for slidably supporting said annular seats;
 c. spring means in said seat retainer bores for biasing said seats against said ball closure element;
 d. annular seat inserts in said seat retainer bores for providing support between said springs and the valve body; and
 e. an assembly retainer sleeve slidably surrounding said seat retainers and having lateral bores coaxial with said seat retainer bores and registrable with said valve body flow openings, said seat inserts extending into said lateral bores, and said assembly retainer sleeve holding said seat assembly together whereby said assembly is insertable into and removable from said valve chamber as a self-supporting unit.

9. A seat assembly according to claim 8 wherein said retainer sleeve establishes a seal between said assembly, valve body, and bonnet.

PO-1050
(5/69)

UNITED STATES PATENT OFFICE
CERTIFICATE OF CORRECTION

Patent No. 3,576,309   Dated April 27, 1971

Inventor(s) John P. Zawacki and Ervin A. Buchta

It is certified that error appears in the above-identified patent and that said Letters Patent are hereby corrected as shown below:

Col. 2, line 3, after "removed" insert -- merely by loweri it into or lifting it out of the chamber--

Signed and sealed this 11th day of April 1972.

(SEAL)
Attest:

EDWARD M. FLETCHER, JR.
Attesting Officer

ROBERT GOTTSCHALK
Commissioner of Patents